US006318692B1

(12) United States Patent
Cyrell

(10) Patent No.: US 6,318,692 B1
(45) Date of Patent: *Nov. 20, 2001

(54) ADJUSTABLE FRAMING SUPPORT SYSTEM

(76) Inventor: Alexander Cyrell, 1501 W. 17th St., Tempe, AZ (US) 85281-6225

(*) Notice: Subject to any disclaimer, the term of this patent is extended or adjusted under 35 U.S.C. 154(b) by 0 days.

This patent is subject to a terminal disclaimer.

(21) Appl. No.: 09/332,957

(22) Filed: Jun. 14, 1999

Related U.S. Application Data

(63) Continuation of application No. 08/579,868, filed on Dec. 28, 1995, now Pat. No. 5,927,668.

(51) Int. Cl.7 .................................................. A47B 81/06
(52) U.S. Cl. ....................... 248/317; 248/316.1; 248/917; 248/924
(58) Field of Search .................................... 248/317, 320, 248/323, 328, 326, 489, 917, 924, 274.1, 278.1, 279.1, 551, 316.1, 316.2, 316.4, 316.6; 24/68 CD, 265 AL, 909; 254/231, 232, 233; 52/720.1, 734.1, 656.5, 656.6, 656.9; 40/783, 784; 269/108, 130, 42, 41, 109, 131, 132, 104

(56) References Cited

U.S. PATENT DOCUMENTS

| 542,966 | * | 7/1895 | Right | 24/909 X |
|---|---|---|---|---|
| 565,916 | * | 8/1896 | McKee | 24/909 X |
| 2,204,493 | * | 6/1940 | Henry | 52/720.1 |
| 2,539,997 | * | 1/1951 | Graves | 24/68 CD X |
| 2,611,949 | * | 9/1952 | Wanamaker | 269/130 |
| 3,429,602 | * | 2/1969 | Dirilgen | 52/656.9 X |
| 3,451,153 | * | 6/1969 | Dohanyos | 40/783 X |
| 3,784,043 | * | 1/1974 | Presnick | 52/656.9 X |
| 4,027,866 | * | 6/1977 | Ruggiero | 269/41 |
| 4,356,648 | * | 11/1982 | Beaulieu | 40/783 |
| 4,831,804 | * | 5/1989 | Sayer | 52/656.5 X |
| 4,924,649 | * | 5/1990 | Taylor | 52/656 |
| 4,997,155 | * | 3/1991 | Reuter et al. | 248/278.1 |
| 5,064,161 | * | 11/1991 | Anderson | 248/317 |
| 5,161,789 | * | 11/1992 | Rogers | 269/108 X |
| 5,165,644 | * | 11/1992 | Allen | 248/285 |
| 5,310,152 | * | 5/1994 | O'Neill | 248/329 |
| 5,393,025 | * | 2/1995 | Franklin | 248/917 X |
| 5,400,993 | * | 3/1995 | Hamilton | 248/278 |
| 5,402,557 | * | 4/1995 | Dalen | 24/68 CD |
| 5,411,244 | * | 5/1995 | Turner | 269/109 X |
| 5,538,214 | * | 7/1996 | Sinila | 248/278.1 |
| 5,927,668 | * | 7/1999 | Cyrell | 248/317 |

FOREIGN PATENT DOCUMENTS

| 181133 | * | 2/1907 | (DE) | 269/108 |
|---|---|---|---|---|
| 457013 | * | 3/1928 | (DE) | 269/108 |
| 2231995 | * | 11/1990 | (GB) . | |

* cited by examiner

Primary Examiner—Anita M. King

(57) ABSTRACT

A mounting system for mounting an object includes a plurality of framing members having a body portion and depending side walls, with at least one continuous slot running along the length of the framing member. A plurality of connecting pieces connect adjacent framing members. The connecting pieces each have a first and second portion interconnected at an angle and in sliding relationship to adjacent framing members. A plurality of inner cornerpieces each having a first and second section at angles to each other have an inner non-slip surface. A corner cover connects to adjacent framing members to cover an underlying connecting piece. A cable extends through slots in the framing member to contract the frame securely and firmly about a mounted object.

31 Claims, 14 Drawing Sheets

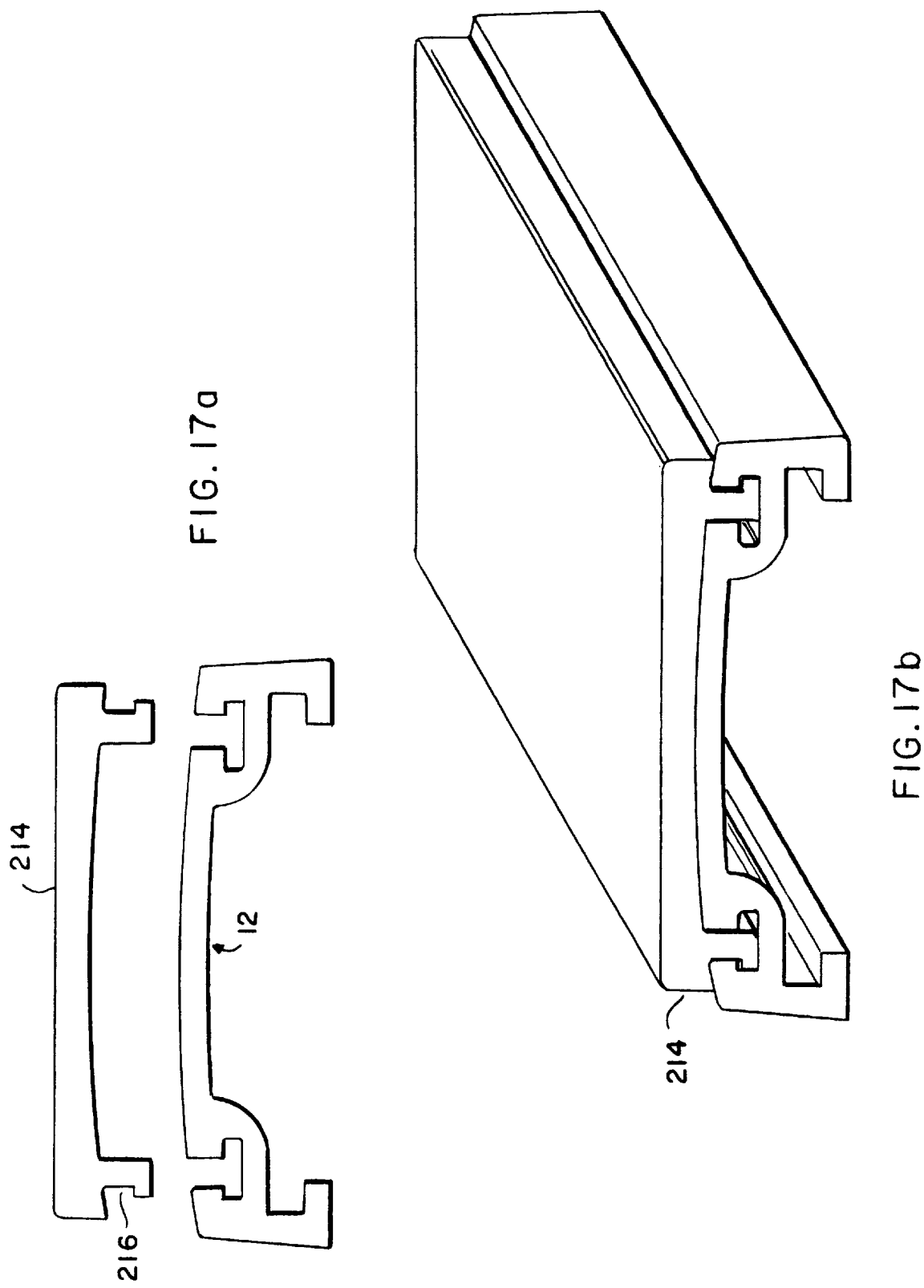

ADJUSTABLE FRAMING SUPPORT SYSTEM

CROSS REFERENCE TO RELATED PATENTS AND APPLICATIONS

This application is a continuation of U.S. patent application Ser. No. 08/579,868, filed Dec. 28, 1995, now U.S. Pat. No. 5,927,668.

FIELD AND BACKGROUND OF THE INVENTION

This invention relates to apparatus and devices for mounting objects. Particularly, the invention is directed towards such mounting apparatus when used in a residential, industrial or commercial application for the purpose of mounting objects such as television sets, computer monitors, speakers, cameras, VCRs and other types of electronic equipment. However, it is to be noted that the apparatus for mounting objects that forms the subject of this invention is not limited for use with the objects mentioned above.

In order to take advantage of limited space availability, special acoustic requirements, or design efficiency, it is useful to provide mounting systems to permit various objects to be placed in a convenient location. Thus, in conventional residential "media centers," computer monitors and television sets are best placed in certain locations, while, for example, speakers may be placed apart, and connected to walls and ceilings for maximum acoustic effect and space-saving efficiency. The invention also addresses multiple speaker "home theater" residential and audio/visual systems.

The present invention provides an apparatus and system for mounting objects of various types, to permit optimal utilization of space availability, adjustability of the object's optimal viewing and/or listening angle, and otherwise achieve aesthetic and design effects which may be tailored to the user's needs.

SUMMARY OF THE INVENTION

According to one aspect of the invention, there is provided an apparatus for mounting an object, the apparatus comprising; an elongated framing member or frame side member having a body portion and a depending side wall extending down each side of the body portion; and at least one continuous pathway such as a slot in the framing member.

Preferably, the body portion is arcuate, and has an inner and outer surface, and the framing member has a pair of slots with each slot located near a depending side wall of the framing member.

Preferably, each slot is T-shaped, and comprises a narrower entry channel from the outer exterior surface of the body portion, and a wider base channel in communication with the entry channel. The T-shaped slot may be defined by the body portion, side wall and a slot wall, the slot wall extending between the body portion and the side wall.

The apparatus may further comprise a continuous flange running down the length of the framing member, the flange being substantially parallel to the body portion and defining a continuous groove between the flange and the body portion. The continuous groove may have a widened base portion, i.e., be essentially T-shaped in cross-section.

The apparatus may further comprise at least one connecting piece or member for connecting two framing members to each other in a desired orientation. The connecting piece conveniently comprises a first portion and a second portion, each of the first and second portions having a lateral tongue on each side thereof, the lateral tongue of the first portion being received in the continuous grooves of a first framing member, and the lateral tongue of the second portion being received in the continuous grooves of a second framing member. The first and second portions of the connecting piece may be located at an angle relative to each other so as to provide a predetermined angle between the first and second framing members. Preferably, the connecting piece is corrugated in cross-section so as to provide at least a continuous trough along its length adjacent to the lateral tongues.

The apparatus may further comprise an intermediate piece located between the framing member and the object, the intermediate piece having an inner and outer surface, wherein the inner surface incorporates a material of a high coefficient of friction. The intermediate piece may be a cornerpiece having first and second sections which are substantially at right angles to each other.

The apparatus may further comprise a corner cover, the corner cover being adapted to cover at least one of the connecting pieces and at least the ends of adjacent framing members held together by the connecting member. The corner cover may comprise a body section and depending side wall sections, the depending side wall section including a plurality of tab members for facilitating a snap-fit connection of the corner cover with one or more framing member.

Preferably, the apparatus further comprises at least one cable, the cable extending through the continuous slot of the framing members and the connecting pieces, the cable being tightened by a tensioning apparatus about a frame defined by framing members and connecting pieces and holding the framing member and connecting pieces firmly in place. Preferably, the tensioning apparatus includes compression springs that permit minor elongation of the cable (or more precisely expansion of the frame) when in the fixed position.

According to another aspect of the invention, there is provided a mounting system for mounting an object, the system comprising: a plurality of elongated framing members or frame side members each having a body portion and depending side walls, with at least one continuous slot running along the length of the framing member, the framing member having an inwardly directed and continuous flange running along the length thereof, the flange and the body portion of the framing member defining a groove; a plurality of connecting pieces for connecting adjacent framing members, the connecting pieces each having a first and second portion and lateral tongues on each of the first and second portions, the connecting pieces being at least partially corrugated in cross-section and defining at least a pair of troughs each adjacent to a lateral tongue, the lateral tongues of the connecting piece being received within the grooves of adjacent framing members so as to connect adjacent framing members at predetermined orientations; a plurality of cornerpieces each having a first and second section at, in a preferred embodiment, substantially right angles to each other, the cornerpiece having an inner and an outer surface with a (preferably plastic) material of high coefficient of friction located at least partially over the inner surface, each corner piece being located, in use, with its outer surface adjacent a corner connection between adjacent framing members and its inner surface with the material of high coefficient of friction thereon adapted, in use, to engage the object to be mounted; and a corner cover for connection to adjacent framing members to cover the joint and any exposed connecting piece; wherein the framing members and connecting pieces are slidably connected relative to each other so as to form an adjustable frame of desired shape and configuration, the mounting system further comprising at least one elongate flexible member or cable extending through the frame formed by the framing members and connecting pieces so as to hold the framing members and connecting pieces securely and firmly relative to each other, the cable being located in the pathway formed by the continuous slots of the framing members and in a trough defined in each of the connecting pieces, the slot of a framing member being aligned with a trough in the connecting pieces.

DESCRIPTION OF THE DRAWINGS

FIGS. 17a and 17b are, respectively, an enlarged perspective view and an enlarged end view of the framing member of FIG. 16 in conjunction with an adapter plate for use therewith.

DETAILED DESCRIPTION OF THE PREFERRED EMBODIMENTS

Figure 5:
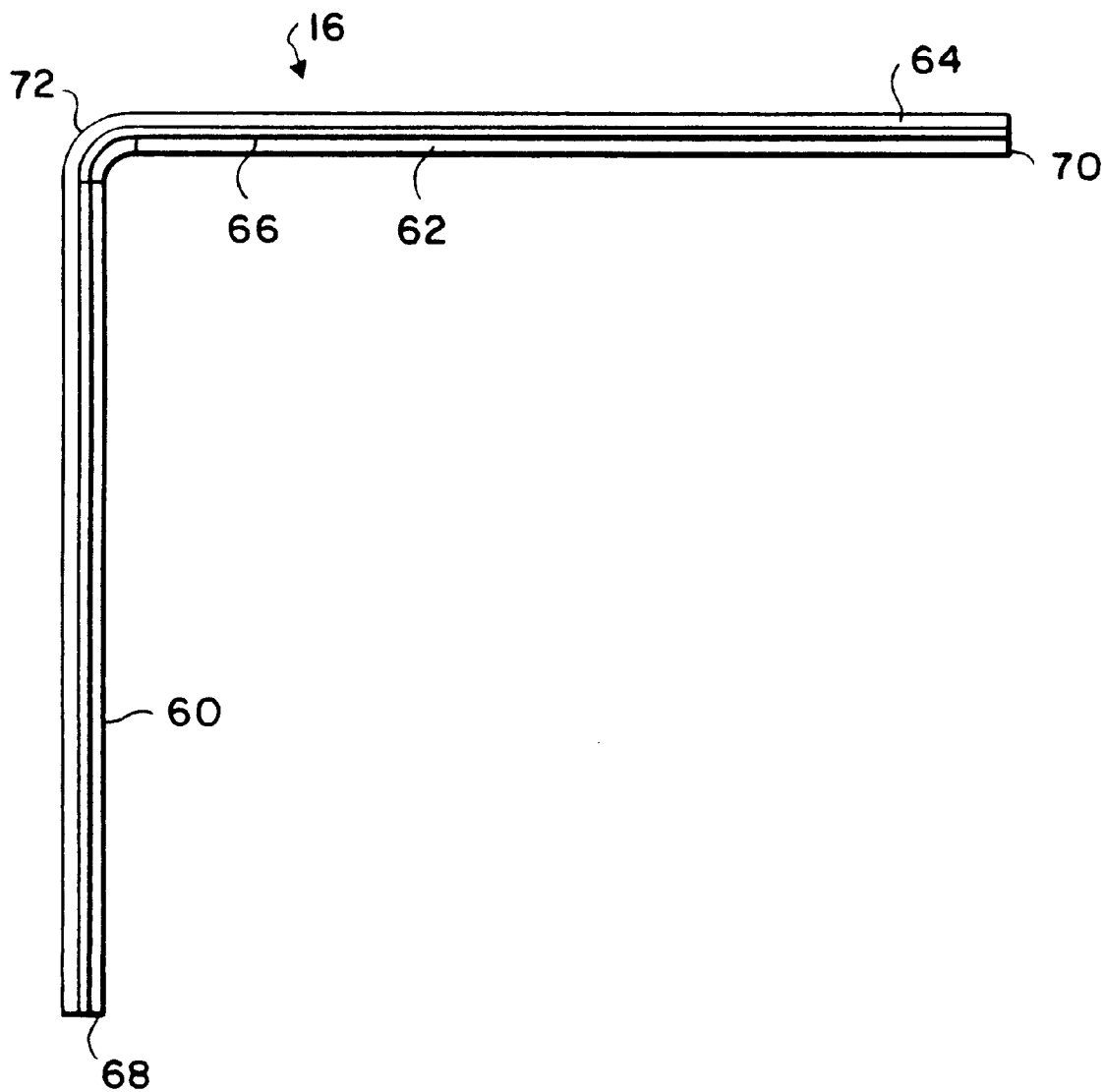
FIG. 5 is a side view of a connecting piece used to connect framing members as shown in FIG. 1.

As will be described below with reference to the attached drawings, the present invention relates to an apparatus for mounting objects, as well as a mounting system. Generally, the apparatus for mounting objects comprises a framing member 12, best illustrated in FIGS. 1 and 2 of the drawings. The mounting system includes a mounting frame 14, the mounting frame 14 including at least two framing members 12, joined together by a connecting piece 16, best shown in FIG. 5, a cable 18, a cornerpiece 20, best shown in FIG. 7 and preferably a corner cover 22, best shown in FIGS. 9 and 10.

Figure 1:
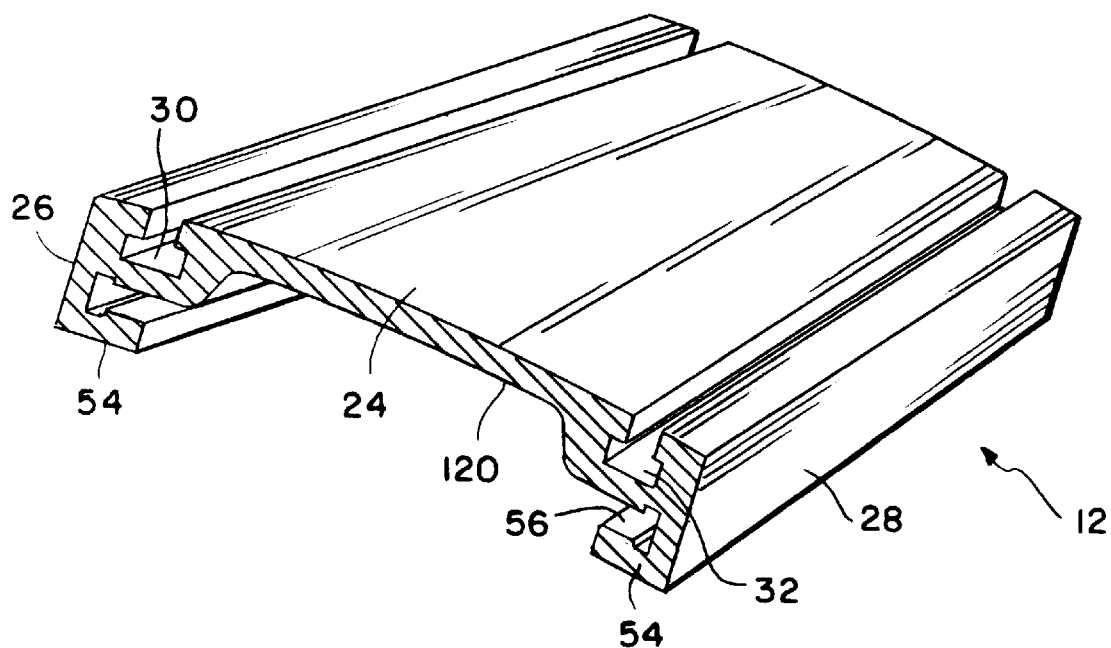
FIG. 1 is a perspective view of a framing member forming part of the mounting apparatus of the invention.
Figure 2:
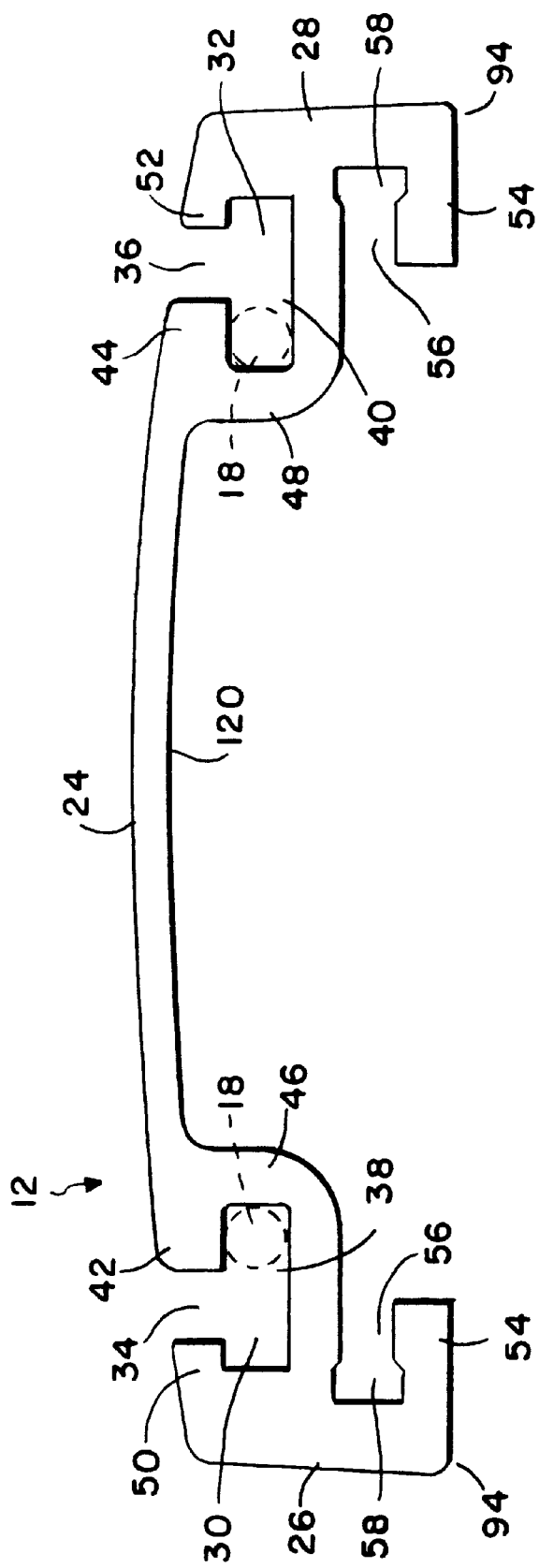
FIG. 2 is an end view of the framing member of FIG. 1.
Figure 3:
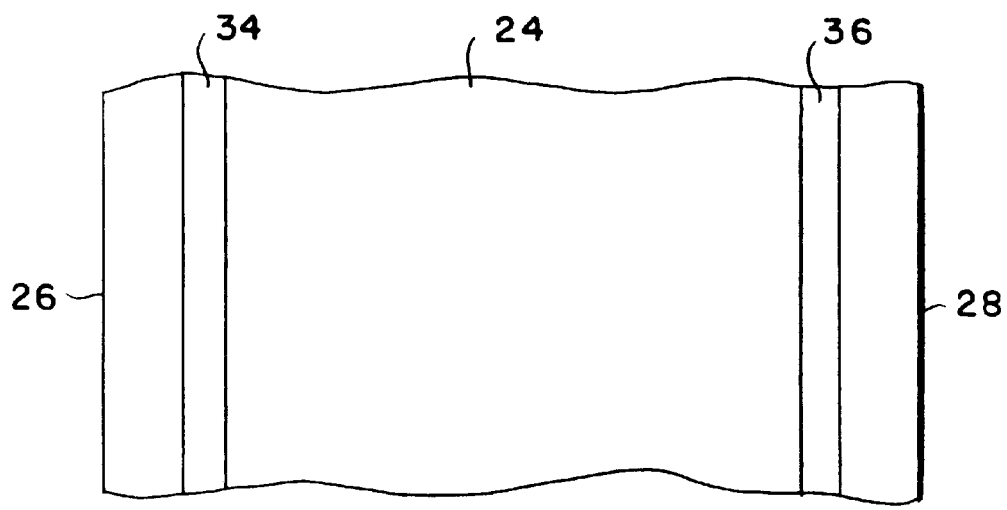
FIG. 3 is a plan view of the framing member shown in FIG. 1.
Figure 4:
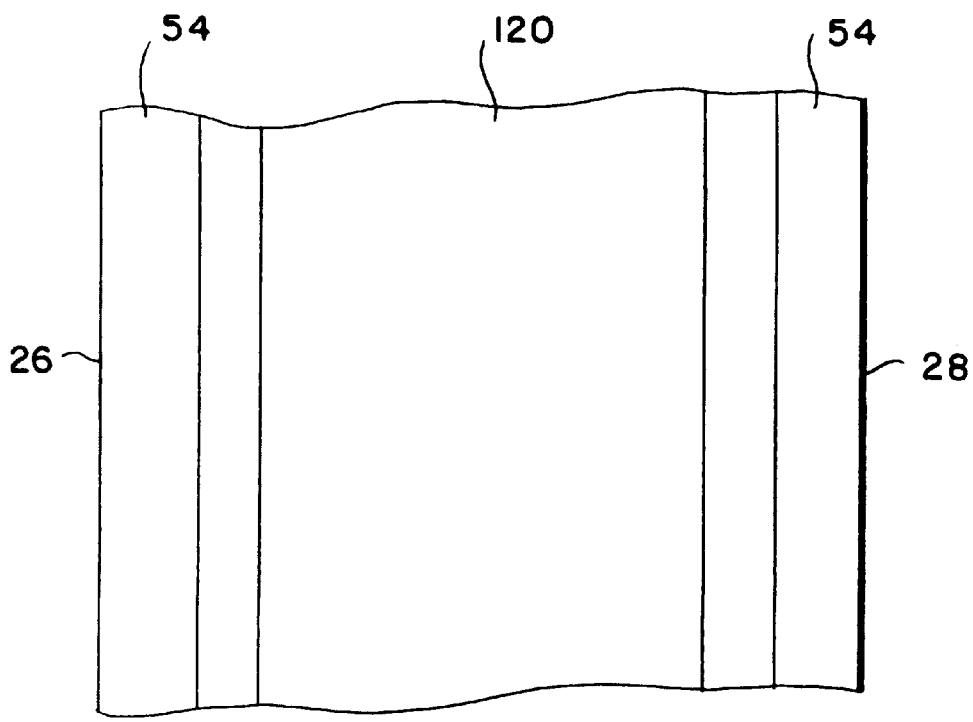
FIG. 4 is a bottom view of the framing member shown in FIG. 1.

With particular reference to FIGS. 1–3, there is shown a framing member 12 having a body portion 24, and two depending side walls 26 and 28. The body portion 24 is slightly convex.

At each end of the body portion 24, there is located a continuous T-shaped slot 30 and 32, each slot having an entry channel 34 and 36 which leads into the base slot 38 and 40. Each T-shaped slot 32 is therefore defined by a body portion projection 42 and 44, a slot wall 46 and 48, and a part of the side wall 26 and 28, each of the side walls having a side wall projection 50 and 52. The slot walls 46 and 48 recess inwardly towards the center making the T-shaped slot asymmetrical, thus accommodating clearance to recess, out-of-view, cable 18.

Each side wall 26, 28 further comprises an inwardly extending flange 54 which, with the remainder of the side wall 28 and the slot wall 48, defines a groove 56 that is continuous and runs the entire length of the framing member 12. The groove 56 is widened at its bottom 58.

As will be described more fully below, a plurality of framing members (or frame side members) 12 may be connected to each other so as to define a frame that is adjustable in size, and may assume just about any shape or configuration as necessary depending upon the object that the mounting frame 14 is intended to support. Any two adjacent framing members 12 may be connected together by a connecting piece 16, best shown in FIGS. 5 and 6 of the drawings. The connecting piece 16 shown in FIG. 5 has a first portion 60 and a second portion 62, the first and second portions being at substantially right angles to each other. However, it will be appreciated that the connecting piece 16 may have first and second portions that are other than at right angles to each other, depending on the shape of the frame that is to be constructed. Furthermore, the connecting piece 16 may simply comprise a substantially straight or linear piece; in other words, such a connecting piece has the first and second portions at 180° to each other. When linear, the connecting piece 16 will join a pair of adjacent framing members 12 where the framing members are intended not to define an angle therebetween.

The connecting piece 16 has a defined width for a particular framing member 12, and comprises a tongue 64 along each side. The tongues 64 at each end of the connecting piece 16 are adapted to be received in the grooves 56 of the framing members 12. Thus, the connecting piece will be sufficiently wide so that it extends at least into the grooves 56 of the framing member 12, but would not be wider than the distance between the side walls 26 and 28 of the framing member.

Between the tongues 64, the connecting piece is preferably comprised of a series of corrugations 66 that impart additional strength to the connecting member and limit the amount the connecting piece may bend or give when under a load.

The first portion 60 of the connecting piece 16 has a first end 68, and the second portion 62 of the connecting piece 16 has a second end 70. When connecting the connecting piece 16 to a framing member 12, the first end 68 is inserted into the region bounded by the grooves 56 in the framing member 12. Since the grooves 56 are continuous, the first portion 60 of the connecting piece 16 slides down along the groves 56, and is able to do so at least until the bend 72 in the connecting piece 16. As will be described more fully below, a mounting frame 14 constructed of the framing members 12 and the connecting piece 16 joining such framing members 12 is variable in size, and the extent to which the first and second portions 60 and 62 of the connecting piece 16 extend longitudinally between the continuous grooves 56 of the framing member 12 will in large part depend upon the size of the mounting frame 14 to be constructed, which in turn depends on the article or object that the mounting frame 14 is intended to support.

From the above description, it will be appreciated that a plurality of framing member 12, interconnected by connecting pieces 16 as described above, gives rise to a mounting frame 14 that may be of any desired size or configuration.

Figure 8:
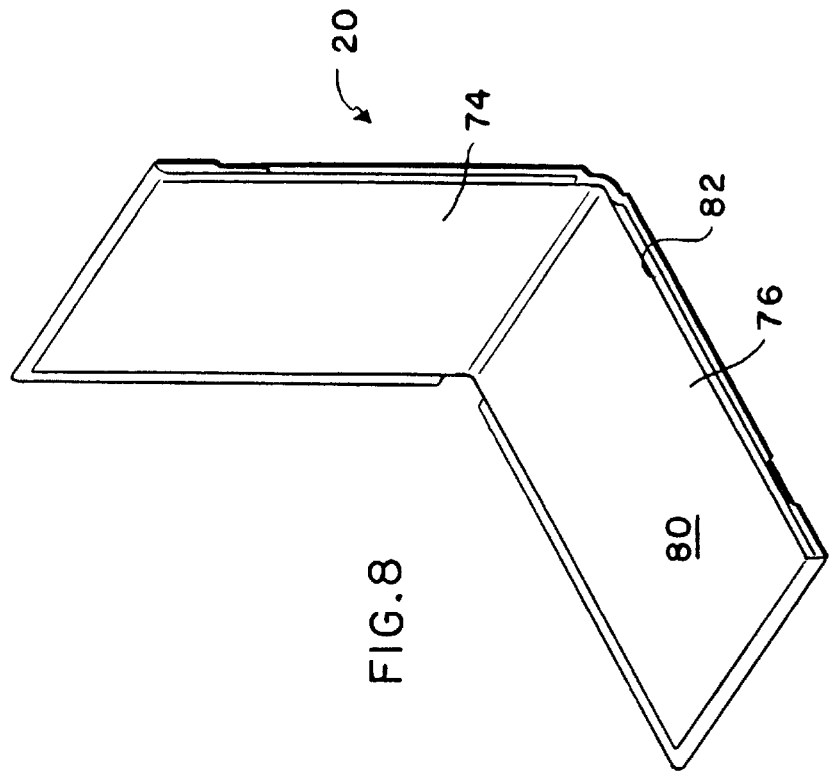
FIG. 8 is a perspective outside view of a corner piece of the mounting system of the invention.
Figure 7:
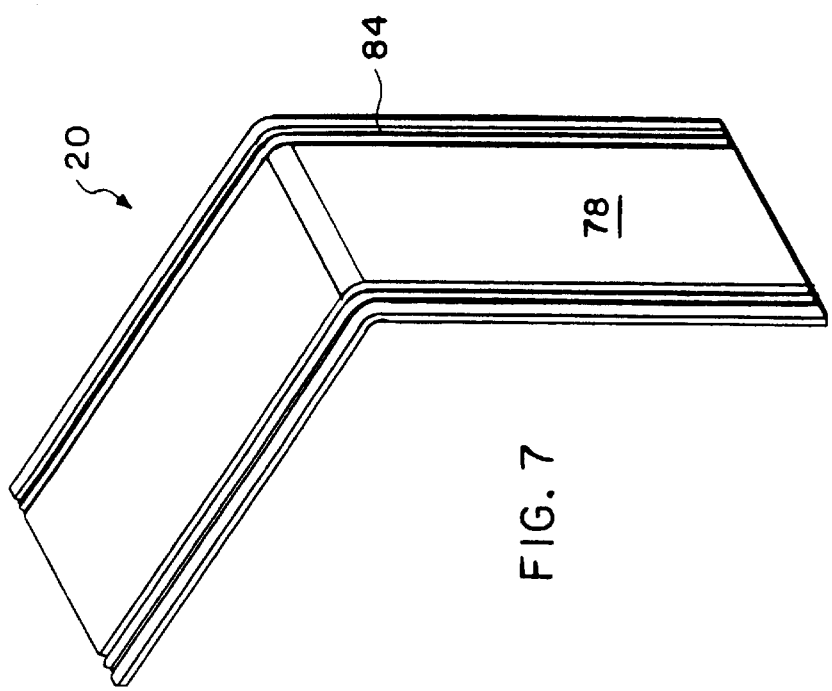
FIG. 7 is a perspective inside view of a corner piece of the mounting system of the invention.

In FIGS. 7 and 8, there is shown a cornerpiece 20 comprising a pair of flat surfaces 74 and 76 joined at an angle to each other. Each flat surface 74 and 76 has an outer side 78, best shown in FIG. 7, and an inner side 80 best shown in FIG. 8. On the inner side 80 of each of the flat surfaces 74 and 76 there is provided a flat hybrid synthetic/rubber or rubber-like material 82, which typically has a non-slip character. A suitable material is available under the trade name Santoprene (among others). The outer side 78 of the cornerpiece has a series of longitudinal ribs 84 extending from one end of the flat surface 74 to the opposite end of the flat surface 76.

In use, as will be described further below, the cornerpiece 20 is intended to be located between the pair of adjacently connected framing members 12 and the object or article that is being mounted. The outer side 78 is, at least along some of its surface area, applied to a pair of adjacent framing members 12, while the rubber-like material 82 of the inner side 80 is in contact with the object or article to be mounted. As the mounting frame 14 is tightened, to be discussed further below, the cornerpiece 20 becomes firmly wedged and compressed between the mounting frame 14 and the object to be mounted. The rubber-like material 82, with the high coefficient of friction, prevents slipping or sliding of the article relative to the cornerpiece 20, especially when the cornerpiece 20 is pushed against the object or article with some force. On the outer side 78 of the cornerpiece 20, the ribs 84 facilitate a firm connection between the cornerpiece 20 and adjacent framing members 12 to securely hold the mounted object in place.

Figures 9, 10:
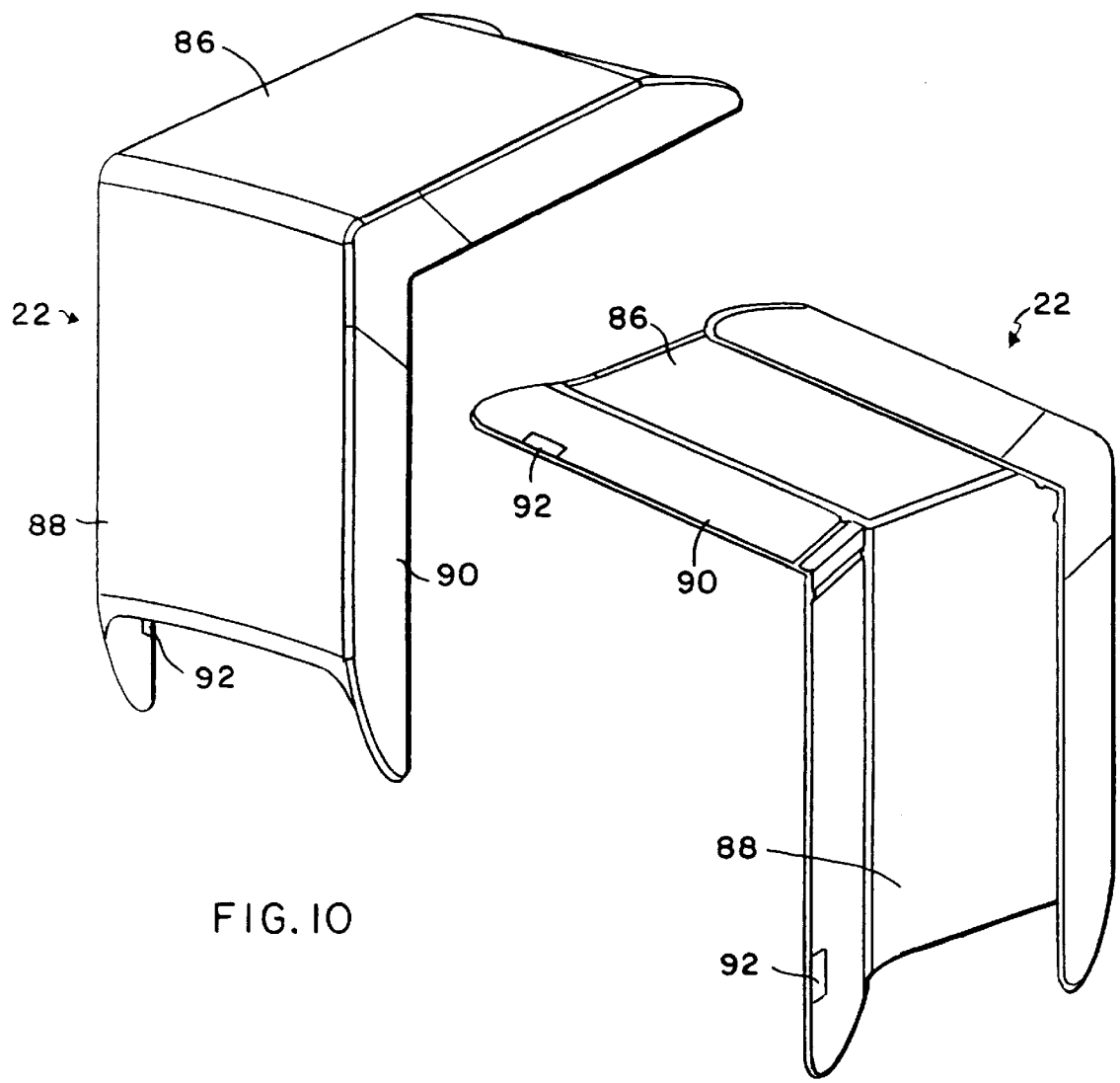
FIG. 9 is a perspective view of the outer side of a corner cover of the mounting system of the invention.
FIG. 10 is a perspective view of the inner side of a corner cover shown in FIG. 9.
Figure 11:
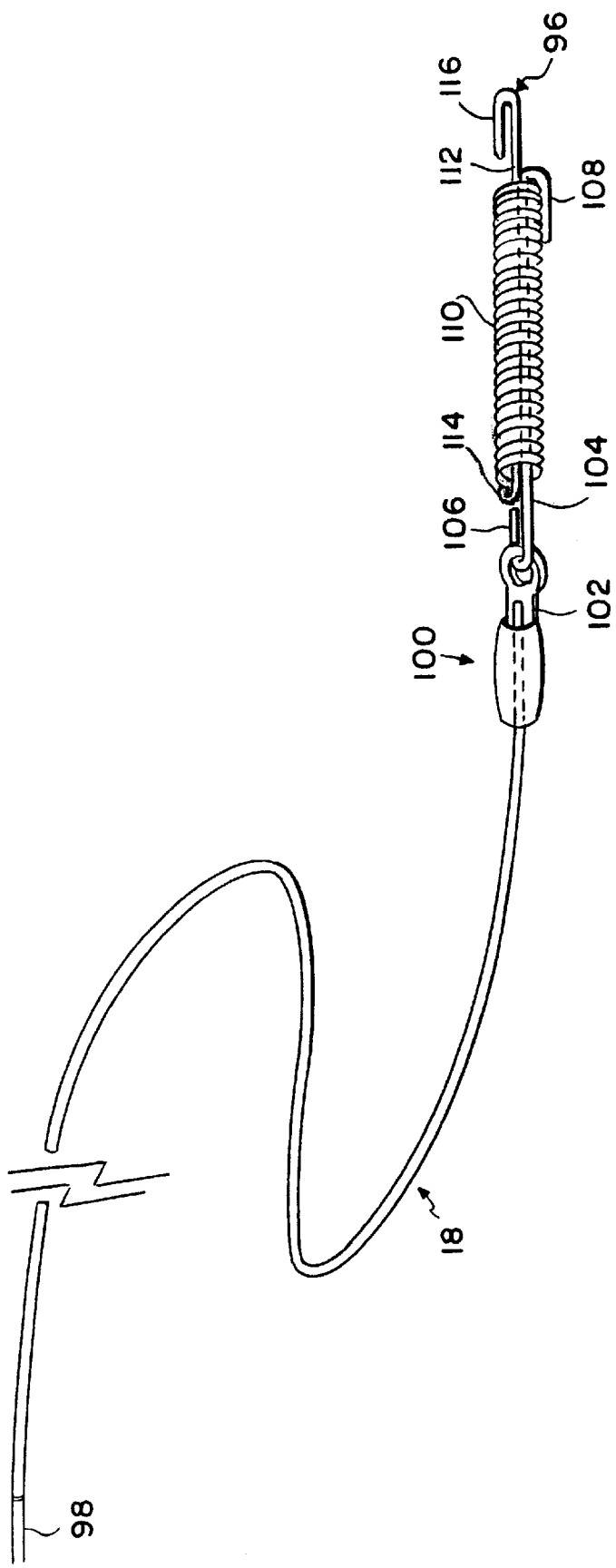
FIG. 11 is a view of a cable of the mounting system.

With reference to FIGS. 9 and 10, when the mounting frame 14 is fully assembled, a corner cover 22 covers the joined ends of the framing member 12 and the connecting piece 16. The corner cover 22 has a pair of first and second walls 86 and 88 respectively, each of the walls 86 and 88 having a depending side wall 90. At appropriate locations on these side walls 90, a number of tabs 92 are provided so that the corner cover 22 can be attached in a slide-on and snap-fit fashion to the framing members 12. The tabs 92 are located so as to snap behind side walls 26 and 28 at tab-connecting point 94 shown, for example, in FIG. 2 of the drawings. While the tabs 92 constitute a secure fit, it is to be noted that they can also be removed since the cover corner 22 is generally comprised of a plastic material and is sufficiently flexible to remove the corner cover 22 to facilitate access or disassembly.

Figure 14:
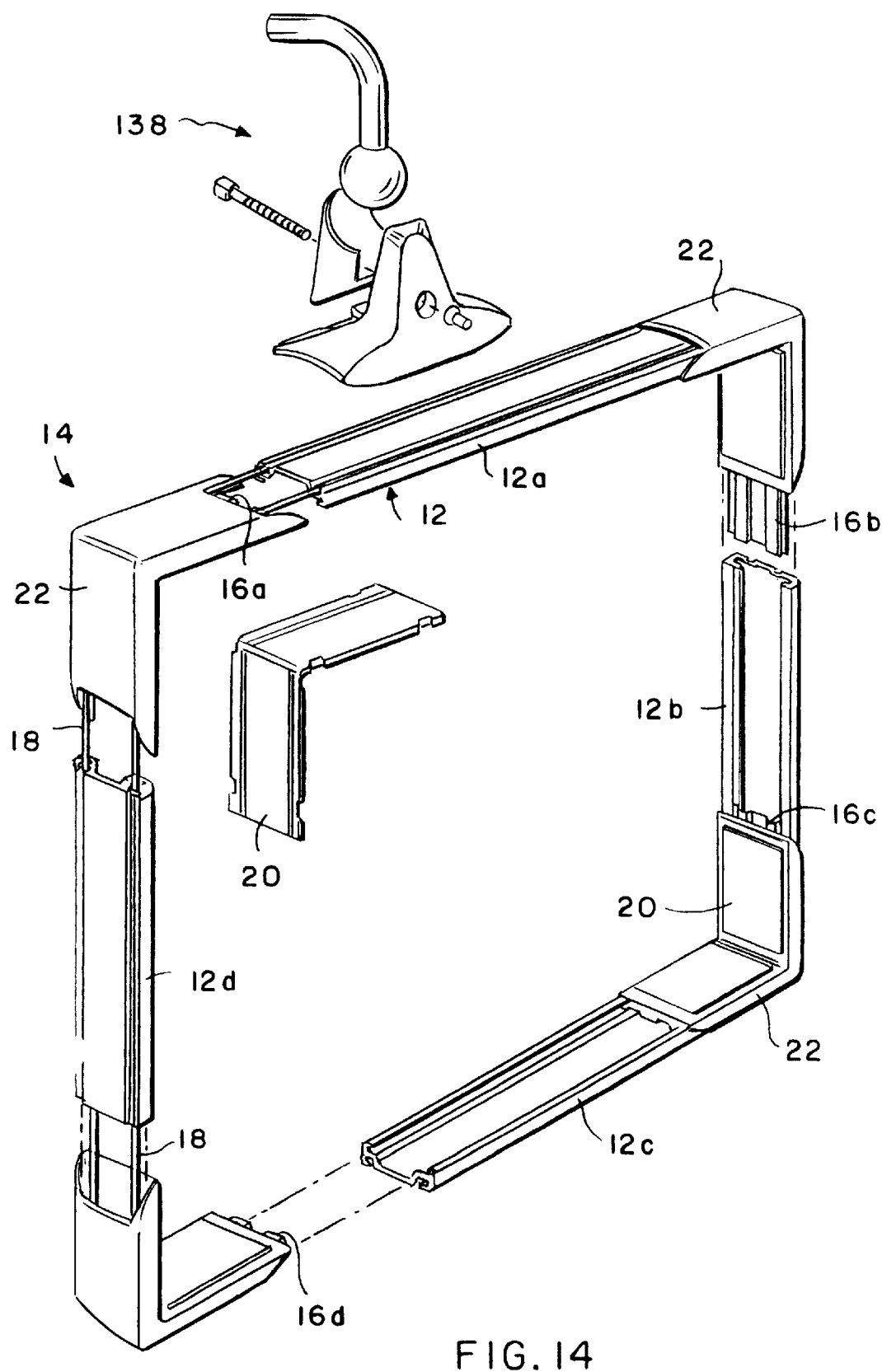
FIG. 14 is a perspective view, partially exploded, of a mounting system of the invention.

The various components of the system of the present invention can be assembled to form a mounting frame 14 generally shown in FIG. 14 of the drawings. With reference to FIG. 14, four framing members 12a, 12b, 12c and 12d are arranged with respect to each other so as to form a rectangle. In this particular instance, the desired size of the rectangle would be used to hold a monitor for a computer or a television. Of course, the various framing members 12 can be arranged to form any desired shape or configuration, including an annular shape, according to the article to be mounted.

With the framing members 12a, 12b, 12c and 12d in a substantially rectangular form, four connecting pieces 16a, 16b, 16c and 16d are used to connect the framing members 12a–12d. Thus, connecting piece 16a connects the framing members 12a and 12d together at a substantially right angle; connecting piece 16d connects the framing members 12d and 12c together at a substantially right angle; connecting piece 16c connects the framing members 12c and 12b at a substantially right angle; and connecting piece 16b connects framing members 12a and 12b at a substantially right angle. It will be appreciated that the connecting members 12a–16d are capable of sliding movement within the continuous grooves 56 of their associated framing members 12a–12d, so that, at least at this stage, there is some variability with respect to the size of the rectangle that the various framing members 12a–12d and connecting pieces 16a–16d may define. Furthermore, the extent of the variability is determined by the lengths of the first and second portions 60 and 62 of the connecting pieces 16. The longer the first and second portions 61 and 62 are, the more such first and second portions 60 and 62 may extend outside the track defined by the grooves 56 on the framing member 12, and the larger the rectangle defined by the various components may be. However, the framing system would still remain functionally operative if the connecting member end became visible. A larger range of movement would, of course, require corner covers with larger first and second walls 86 and 88.

In order to hold the framing members 12a–12d and the connecting pieces 16a–16d in position, a cable 18 lies in each of the frame members 12a–12d and connecting pieces 16a–16d. In this regard, the slot base 38 and 40 of the continuous T-shaped slots 30 and 32 are adapted to receive the cable 18. Thus, the cable is inserted into the T-shaped slot through the entry channels 34 and 36, and afterwards, moved into the inner portion of the base slots 38 and 40 respectively. With reference to FIG. 2, the position of the cable 18 is shown in phantom lines in the base slots 38 and 40 of the T-shaped slots 30 and 32.

Figure 6:
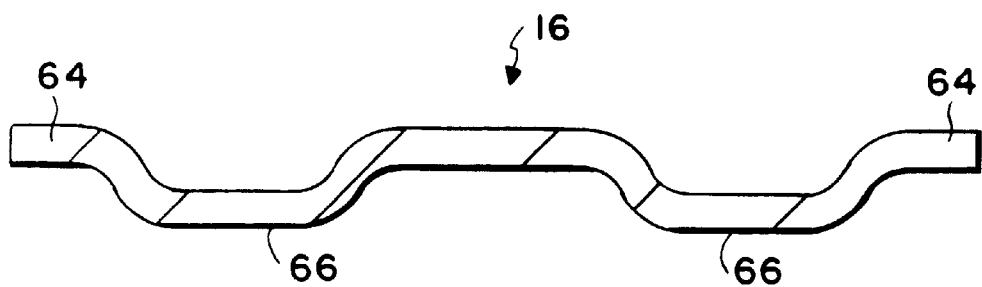
FIG. 6 is an end view of the connecting piece shown in FIG. 5.

The cable 18 extends through the base slot 38 and 40 of the T-shaped slots 30 and 32 of each of the framing members 12a–12d, and then passes over the outer side of each connecting piece 16a–16d. The corrugations 66 prevent any substantial lateral movement as it passes over each connecting piece 16a–16d. With reference to FIG. 6, it will be seen that the corrugations 66 provide two troughs, one on each side of the connecting piece 16. Each trough is designed to receive the cable 18. The trough offers a path for the cable 18 that continues from the base slots 38 and 40. The trough also serves to initially position, and maintain the position of, the cable 18 in the correct location.

The cable 18 has a first end 96 and a second end 98 that joins to the first end 96 in any suitable matter. Below two embodiments of the cable connection and tensioning apparatus that may be used in accordance with this invention are described (see FIGS. 12 and 13).

Between the first end 96 and the second end 98 on the cable 18, there is preferably provided a cable tensioning apparatus 100. The use of a cable tensioning apparatus is preferred since the cable can, over time, slip or loosen. In addition, some small amount of "play" in the length of the cable is desired so that the mounting frame 14 can withstand certain movements without compromising the integrity of the entire system. In addition, constant cable tension provided by the force of the compression on spring 110 is desired to eliminate slippage or loosening over time. The compression spring also provides additional travel to facilitate adequate travel during tensioning.

In this embodiment, the tensioning apparatus 100 may include a ring clamp 102 near the first end 96 of the cable 18. A first tie 104 with a hook 106 and 108 at each end of the cable 18 is provided. The hook 106 engages the ring clamp 102, while the hook 108 extends through a compression spring 110, around which it attaches. A second tie 112, also having a hook 114 and 116 at each end is provided. The hook 114 of the second tie 112 extends through and around the compression spring 110, while the hook 116 on the second tie 112 is available for connection to the second end 98 of the cable 18. Alternatively, the first and second ends 96 and 98 of the cable 18 may be attached in a fixed manner to a part of the mounting frame.

In assembling the mounting frame 14 around an object to be mounted, the framing members 12a–12d and connecting pieces 16a–16d are assembled with respect to each other as shown in FIG. 14, and two cables are threaded through the framing members 12a–12d and connecting pieces 16a–16d as described above. The cable is held loosely, so that the area defined by the mounting frame 14 is slightly larger than the object to be mounted. The tensioning means 100 is intended to incorporate two independently functioning cable assemblies, either sufficient to support the object at the maximum rated load, should one cable assembly fail at any time.

At this time, a cornerpiece 20 is placed at each of the four corners of the object to be mounted. The rubber-like material 82 is permanently affixed to the cornerpiece 20. Each cornerpiece 20, placed at a corner of the object, will remain in contact with the object. It is unlikely to slip because of the high coefficient of friction provided by the rubber-like material 82. With each cornerpiece in position, the object and mounting frame 14 are brought into registry with each other so that the mounting frame surrounds the object at the desired position. In this position, the mounting frame 14 may be tightened and secured to firmly hold the object. To this end, the cable is tightened, drawing the framing members 12a–12d and connecting pieces 16a–16d more closely and more tightly together, and bringing compressive pressure on the object through surface contact with the rubber-like material 82 on the cornerpieces 20. When the cable 18 has been sufficiently tightened, the cornerpieces 20 and rubber-like material 82 will be firmly wedged between the object being mounted and the mounting frame 14 defined by the framing members 12a–12d and connecting pieces 16a–16d. After sufficient tightening, the ends of the cable 18 are secured so that further movement of the cable is not permitted. As mentioned above, a minor movement of the cable will be possible if a spring 110 is used as part of a tensioning apparatus 100, but this movement will be insufficient to allow the mounted object to fall out of the mounting frame 14. Therefore, the object, such as a television monitor, now has a mounting frame 14 securely tightened around its perimeter. For example, when used to mount a television monitor, the mounting frame is intended to be positioned in line with the television monitor's center of gravity situated in almost all cases at the very front of the television monitor enclosure.

At this point, a corner cover 22 may be placed on and snapped into position at each corner to cover the joint between the adjacent framing members 12 and to cover the particular connecting piece or pieces 16. The corner covers 22 have a snap-fit connection to the frame member 12, with the tabs 92 of the corner cover 22 fitting around the tab connecting point 94 of the framing member 12. The corner cover 22 can be easily removed, being made of plastic material, for appropriate adjustment or disassembly of the mounting frame 14 as necessary. The entire mounting frame is intended to present a low, unobtrusive profile in relation to the object or device to be mounted.

The framing members 12 and connecting pieces 16 are generally comprised of aluminum or steel, particularly where the object to be mounted is heavy. For smaller, lightweight objects, these components may be comprised of strong plastic such as polyurethane and/or polycarbonates.

Figure 12:
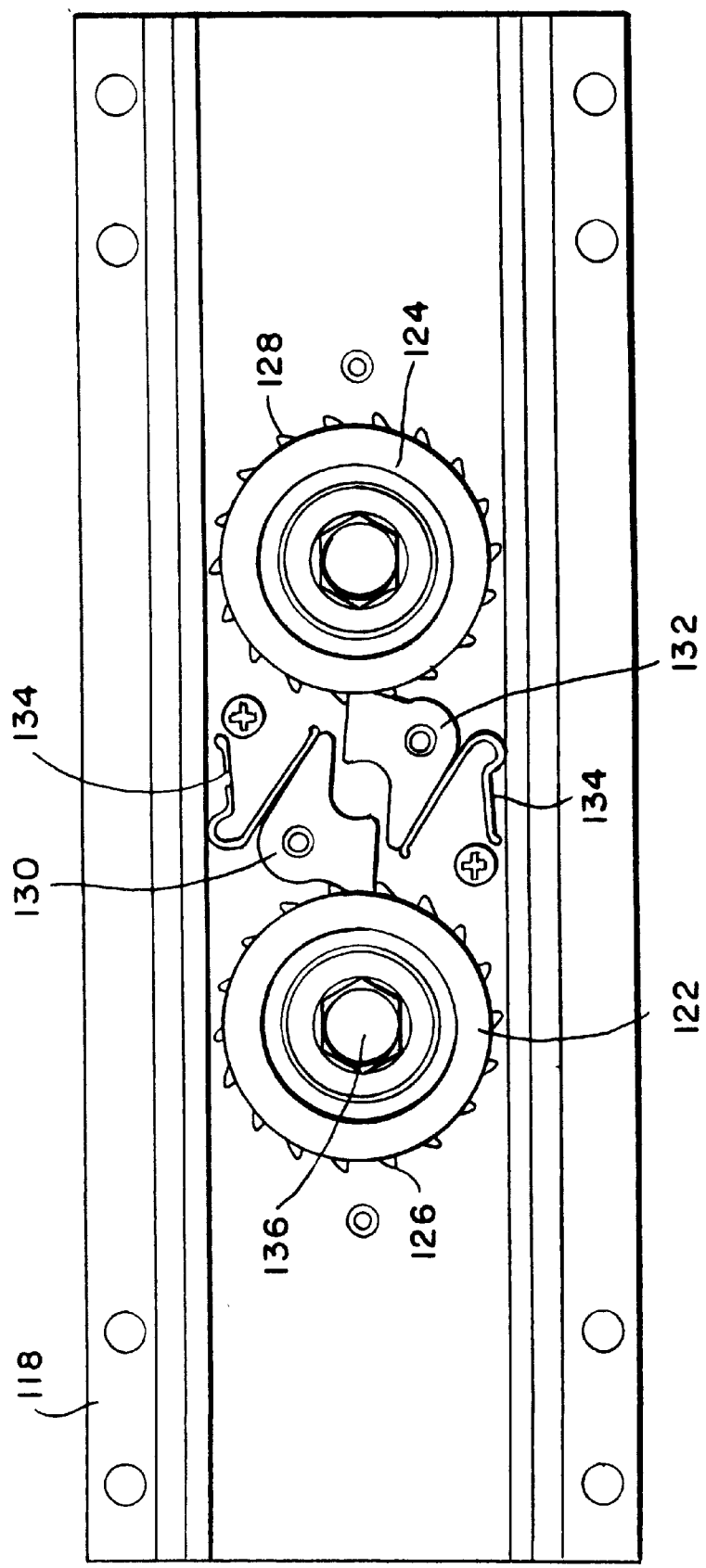
FIG. 12 is a plan view of a first embodiment of a cable tensioning apparatus of the mounting system of the invention.

FIG. 12 shows another embodiment of a cable tensioning apparatus for use in the present invention. A base plate 118 is provided which is adapted to lie below the body portion 24 of the framing member 12. Thus, the base plate 118 will typically abut or be adjacent to the inner surface 120 of the body portion 24. On the base plate 118, there are located two cable wheels or reels 122 and 124 with one end 96 of the cable 18 winding around the cable wheel 124 with the other end 98 of the cable 18 winding around the other cable wheel 122. Each cable wheel 122 and 124 incorporates a ratchet gear wheel 126 and 128 and a corresponding pawl 130 and 132. Associated with each pawl 130 and 132 is a pawl spring 134.

Typically, the body portion 24 of the framing member 12 will have holes therein corresponding to the position of the hub 136 of each wheel 122 and 124, and with the use of appropriate tools, extending through the hole, the cable wheels 122 and 124 can be turned to effect the necessary tightening and tensioning of the cable to securely hold the mounting frame 14 in the desired position.

Figure 13:
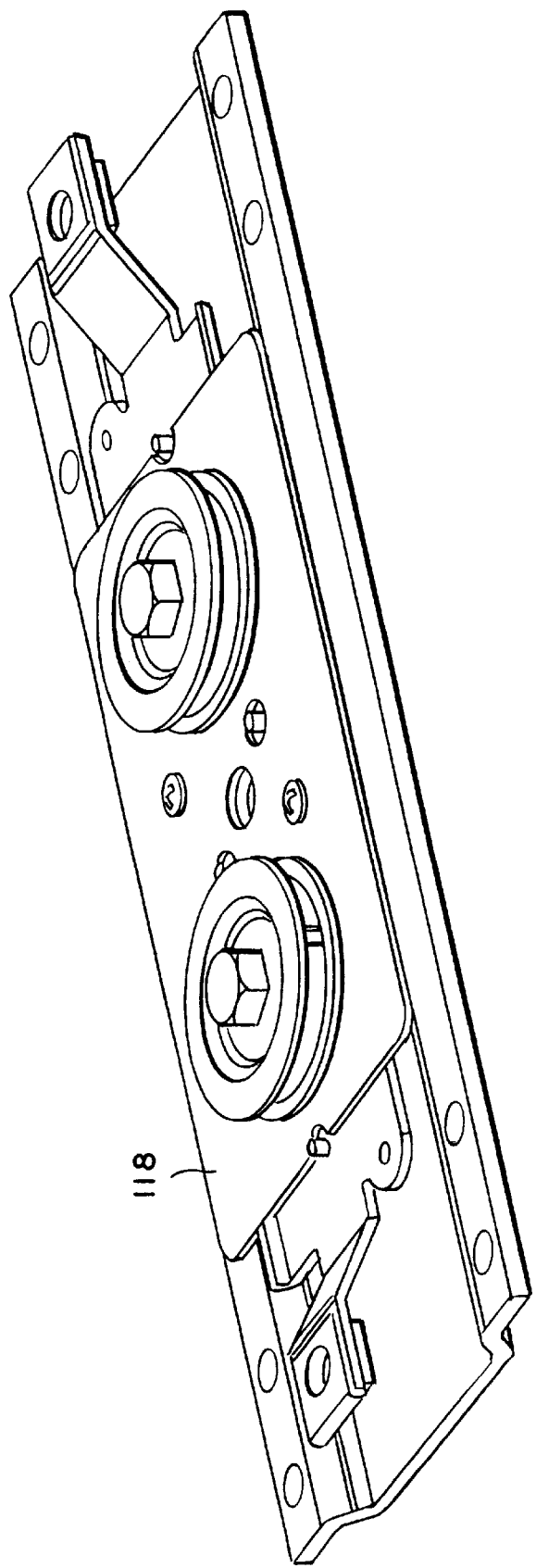
FIG. 13 is a perspective view of a second embodiment of the cable tensioning apparatus of the mounting system of the invention.

FIG. 13 shows yet another embodiment of a cable tensioning apparatus with conventional cable wheels or reels that can be tightened to effect the necessary tension in the cable, and the wheels thereafter bolted securely to the base plate 118.

Figure 16:
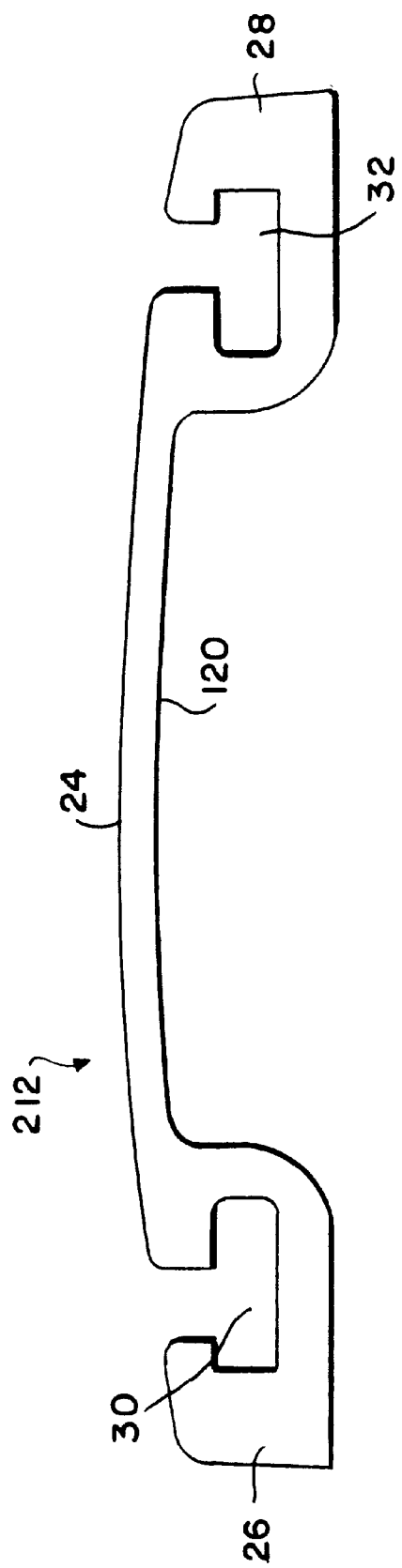
FIG. 16 shows a second embodiment of a framing member of the invention.

Turning now to FIG. 16, there is shown a second embodiment of a framing member 212, which is in all material aspects identical to the framing member 12 shown in FIGS. 1–3, except that the side walls 26 and 28 are shorter, and no flange 54 is provided. There is, of course, no groove 56. A mounting member of the type shown in FIG. 16 may be used for a different mounting purpose. For example, an extended extrusion of the framing member 212 may be bolted to a wall, and an adapter plate 214 is structured so as to be received and slide within the T-shaped slots 30 and 32. Each adapter plate 214, an example of which is shown in FIGS. 17a and 17b of the drawings, has a pair of L-shaped projections 216, which are spaced and designed to slide freely in the continuous T-shaped slots 30 and 32. Each adapter plate 214 includes a fixing means, which may comprise a bolt in a threaded hole. As the bolt is tightened, it will apply pressure to the body portion, thus fixing the adapter plate with respect to the body portion. The adapter plate is then available for use, and, depending on its shape and configuration, will either support or permit to be mounted desired objects.

Figure 15:
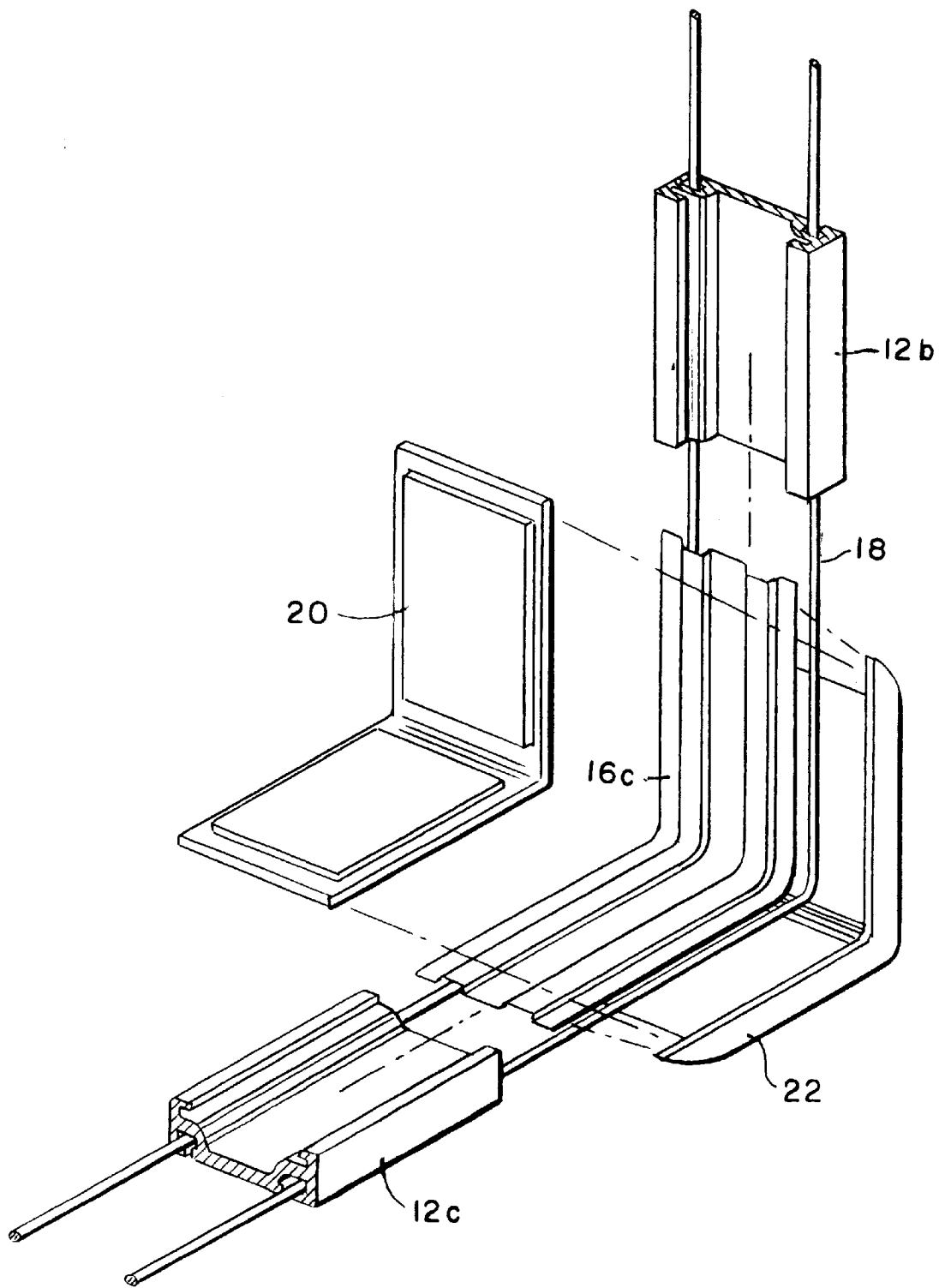
FIG. 15 is a detail of the corner arrangement of the mounting system shown in FIG. 14.

It may also be noted that the framing member 12 shown in FIGS. 1–3 is also capable of mounting on a wall so that an adapter plate 214 may slide within the T-shaped slots 30 and 32. Indeed, an advantage of mounting a framing member 12 of the type shown in FIGS. 1–3 against a wall is that the mounting pieces may be located behind the body portion, namely, between the body portion and the wall, and therefore not be visible when mounted. An adapter may therefore comprise a plate which slides in and is received in the continuous grooves 56, the plate being mounted to the wall. Once the plate is mounted to the wall, the framing member 12 is located over the plate, and one or more such plates may hold the framing member 12 in position. In such as arrangement, usually only one bolt is required through the body portion of the framing member, as opposed to two or more bolts, which may be visible, which are required when using a framing member 212 of the type shown in FIG. 15. The plate may be integrated as part of a die-cast and cap fitting that both dresses-down the end of framing member 12 and slides into the continuous grooves 56 of the framing member 12.

The apparatus for mounting an object, and the mounting system of the present invention, have a wide variety of applications and uses, as alluded to above. Thus, the framing member 12, in conjunction with connecting pieces 16 of different angle, can be used to create a frame of just about any size and shape, and therefore be easily adapted to mounting an object of any size or shape. As an example, the articles or objects which may be mounted by a system described in the present invention include computer monitors, television sets, cameras, VCRs, speakers, computers, printers, microwave ovens and a host of other electronic equipment. The components of the present invention additionally provide an aesthetically pleasing, low-profile frame which would, from a design point of view, enhance the appearance of a residential media center, home theaters or any other environment in which it is located. The invention has applications not only in residential media center and home theaters, but also with respect to commercial displays in retail outlets, positioning of electronic equipment in theaters, cinemas, broadcast and production facilities and corporate boardrooms and the like.

Once the mounting frame 14 has been properly located around an object, such as a television set, the mounting frame is attached to any suitable and/or conventional mounting system 138, as shown in FIG. 14 of the drawings. With desired mounting systems, which may comprise ball and socket connections or elbow joints, the frame, together with the object therein, can be attached to a wall, ceiling or floor so that its position is exactly as desired.

The system also has certain advantages particularly with respect to television sets and computer monitors. In this regard, the mounting frame 14 can be located about that portion of the object through which the center of gravity passes. When mounted in this way, the object will be relatively well "balanced" within the mounting frame, and therefore unnecessary load due to uncentered mounting can be avoided.

This system also provides a particularly secure connection with the object. The ability to design the frame to exactly fit the object to be mounted, the high coefficient of friction of the material in the cornerpiece 20 which is directly in contact with the object, all coupled with the ability to tension the cable to tighten the entire the mounting frame 14 to suit the circumstances, provide for an extremely secure and stable arrangement. Thus, the mounted object will not easily be displaced from the mounting frame by any unintentional knock or shaking, or any violent motion produced by an earthquake. The use of two fully independent cable systems in the mounting frame is an added safety feature since, if one cable were to become loose or otherwise fail, the other cable would still continue to function and essentially hold the mounting frame together.

The system is also exceptionally flexible in that mounted objects can be moved, for example, from one residence to another, without actually dismantling the mounting frame 14 from the object mounted. Rather, the object will remain in the frame, and the entire structure disengaged from the floor, wall or ceiling, so that when moving the system only a minimal amount of deconstruction and reassembling is necessary.

The invention is not limited to the precise constructional details illustrated or described above. Thus, the framing member 12 may have a configuration or shape other than that described. For example, the body portion need not be arcuate, the continuous T-shaped slots may be of slightly different shape, with other small constructional changes. Moreover, any suitable means for fastening and/or tensioning the cable may be provided. Additionally, and where appropriate, the cornerpiece 20 may be omitted, or be incorporated into the framing member 12 or connecting piece 16 which may have extensions or projections for the purpose of frictionally engaging the object to be mounted.

What is claimed is:

1. A mounting apparatus for mounting an object, the apparatus comprising:
    (a) a compressible frame of elongate frame side members forming exterior sides of the frame and each defining an internal pathway therein,
    (b) a series of angular connecting pieces connected in sliding relation between pairs of the frame side members to define corners of the frame, and
    (c) a frame contracting mechanism operative between the connecting members and the side members, the contracting mechanism including an elongate flexible member within the pathways defined by the side members and extending substantially entirely along the frame.

2. The mounting apparatus according to claim 1, wherein the frame side members mask the flexible member from view along sides of the frame.

3. The mounting apparatus according to claim 2, wherein the flexible member is a cable entrained through the internal pathways of the frame side members.

4. The mounting apparatus according to claim 3, wherein the internal pathways are a series of slots opening to exterior surfaces of the frame side members.

5. The mounting apparatus according to claim 4, wherein the slots have enlarged interior portion receiving the cable in a location out of view from the exterior of the frame.

6. The mounting apparatus of claim 5, wherein the connecting piece defines at least one trough in alignment with the enlarged portion of the slots to receive the cable.

7. The mounting apparatus according to claim 1, wherein each of the angular connecting pieces comprises an outer side, the flexible member extends over the outer sides of the angular connecting pieces and the mounting apparatus further comprises corner covers overlying the angular connecting pieces and masking the flexible member from view.

8. The mounting apparatus of claim 7, wherein each of the corner covers has first and second cover portions joined together at a fixed angle, wherein each of the first and second cover portions of the corner covers has a pair of skirts projecting inwardly toward the interior of the frame, laterally spaced apart, and receiving a frame side member between them, and wherein the pairs of skirts substantially mask the sides of the connecting pieces from view.

9. The mounting apparatus according to claim 1, wherein the frame side members have a lateral cross sectional dimension, measured from their innermost to their outermost surfaces, that is less than their transverse cross sectional dimension measured from their front to rear surfaces, providing a low profile to the frame.

10. The mounting apparatus according to claim 1, wherein the frame contracting mechanism further comprises a tensioner connected with the flexible member to place the flexible member in tension to contract the frame about a mounted object.

11. The mounting apparatus according to claim 10, wherein the tensioner comprises a spring connected with the flexible member.

12. The mounting apparatus according to claim 10, wherein the tensioner comprises at least one take-up reel about which the flexible member is wound.

13. The mounting apparatus according to claim 12, wherein the tensioner further comprises a ratchet mechanism connected with the take-up reel.

14. The mounting apparatus according to claim 10, wherein the tensioner includes a spring connected to the flexible member permitting minor expansion and contraction of the frame with the flexible member under tension.

15. The mounting apparatus according to claim 1, further comprising a connecting mechanism for connecting the frame to a support arm, the connecting mechanism having a portion thereof secured to a frame side member and a contractible socket for receiving a ball secured to the support arm.

16. The mounting apparatus according to claim 1, wherein each connecting piece comprises first and second portions joined together at an angle.

17. The mounting apparatus according to claim 16, wherein the first and second portions of the connecting pieces are joined at substantially right angles such that the frame is substantially rectangular.

18. The mounting apparatus of claim 16, further comprising a flange disposed adjacent to each edge of the frame side member, wherein the flanges are substantially parallel to the major axis of the frame side member and define grooves running lengthwise of the frame side members, the first and second portions of the connecting pieces being slidably received in the grooves of adjacent frame side members.

19. The mounting apparatus of claim 1, further comprising an intermediate piece located between the frame and a location inward of the frame for receiving a mounted object, the intermediate piece having a slip-resistant inner surface facing that location.

20. The mounting apparatus of claim 19, wherein the intermediate piece has outwardly projecting ribs on its outer surface, the ribs engaging at least one of the frame side members.

21. The mounting apparatus according to claim 19, wherein the intermediate piece is a cornerpiece.

22. The mounting apparatus of claim 1, further comprising at least one corner cover, wherein the corner cover is adapted to cover at least one connecting piece and at least the ends of adjacent side members.

23. The mounting apparatus of claim 22, wherein each of the corner covers has tabs along an inside edge for removable attachment to at least one connecting piece and frame side member.

24. The mounting apparatus of claim 1, wherein the pathways comprise a pair of spaced apart longitudinal slots in each of the frame side members.

25. An adjustable mounting apparatus for supporting objects of various sizes, the apparatus including:
   (a) a frame constructed of elongate frame side members and corner-defining connecting pieces, slidably connected between an adjacent two of the frame side members for adjustment of the size of the frame; and
   (b) a frame contracting component operative to slide a connecting piece relative to an associated frame side member to contract the frame about an object to be mounted;
   (c) said frame contracting component being received internally of each of the frame side members and extending adjacent of the connecting pieces to effect movement therebetween,
whereby the frame contracting component is at least substantially masked from view within each of the frame side members.

26. The adjustable mounting apparatus of claim 25, wherein the frame contracting component comprises an elongate flexible member.

27. The adjustable mounting apparatus of claim 26, wherein the elongate flexible member is a cable.

28. The adjustable mounting apparatus of claim 26, further comprising means for applying tension to the elongate flexible member.

29. The adjustable mounting apparatus of claim 25, further comprising corner covers overlying corresponding ones of the corner-defining connecting pieces and masking the connecting pieces and a portion of the frame contracting component from view.

30. The adjustable mounting apparatus of claim 29, wherein the connecting pieces and the corner covers are in sliding relationship to adjacent frame side members.

31. The adjustable mounting apparatus of claim 25, further comprising a plurality of interior corner pieces configured to fit in corners of the frame and having a slip-resistant surface facing inward of the frame.

* * * * *